United States Patent
Gill et al.

(10) Patent No.: US 7,409,426 B2
(45) Date of Patent: Aug. 5, 2008

(54) METHOD AND SYSTEM FOR PROVIDING EASY ACCESS TO AN E-MAIL ACCOUNT VIA A MOBILE COMMUNICATION NETWORK

(75) Inventors: Thorsten Gill, Bonn (DE); Tarek Salem, Bonn (DE); Klaus Weis, Sankt Augustin (DE)

(73) Assignee: T-Mobile Deutschland GmbH, Bonn (DE)

( * ) Notice: Subject to any disclaimer, the term of this patent is extended or adjusted under 35 U.S.C. 154(b) by 806 days.

(21) Appl. No.: 10/720,405

(22) Filed: Nov. 24, 2003

(65) Prior Publication Data
US 2004/0132429 A1 Jul. 8, 2004

(30) Foreign Application Priority Data
Nov. 25, 2002 (EP) .................. 02026178

(51) Int. Cl.
*G06F 15/16* (2006.01)
(52) U.S. Cl. ............... 709/206; 709/218; 709/229
(58) Field of Classification Search .............. 709/200, 709/206, 209, 218, 229; 370/218, 229
See application file for complete search history.

(56) References Cited

U.S. PATENT DOCUMENTS

| | | | | |
|---|---|---|---|---|
| 5,640,541 | A * | 6/1997 | Bartram et al. ............. | 703/26 |
| 5,978,566 | A * | 11/1999 | Plank et al. .................. | 709/206 |
| 6,684,248 | B1 * | 1/2004 | Janacek et al. .............. | 709/225 |
| 6,885,861 | B2 * | 4/2005 | Koskelainen ............. | 455/414.2 |
| 6,930,709 | B1 * | 8/2005 | Creamer et al. .......... | 348/211.3 |
| 6,973,481 | B2 * | 12/2005 | MacIntosh et al. .......... | 709/206 |
| 7,013,350 | B2 * | 3/2006 | Enns et al. .................. | 709/245 |
| 7,275,095 | B1 * | 9/2007 | Lebouill ...................... | 709/223 |
| 2001/0023446 | A1 | 9/2001 | Balogh ........................ | 709/229 |
| 2002/0046257 | A1 * | 4/2002 | Killmer ....................... | 709/218 |
| 2002/0122410 | A1 * | 9/2002 | Kulikov et al. ............... | 370/349 |

(Continued)

FOREIGN PATENT DOCUMENTS

EP 1 148 747 10/2001

OTHER PUBLICATIONS

"Universal Mobile Telecommunications System (UTMS), Multimedia Messaging Service (MMS), Functional Description, Stage 2 (3GPP TS 23/140 version 4.2.0 Release 4", Mar. 2001.

(Continued)

*Primary Examiner*—Jason Cardone
*Assistant Examiner*—Thomas Duong
(74) *Attorney, Agent, or Firm*—Baker & Daniels LLP

(57) ABSTRACT

A method and a system for providing easy access to an e-mail account, in particular a POP3/SMTP e-mail account, via a mobile communication network. The method comprises the steps of: providing a mobile terminal having a generic e-mail configuration with at least one default POP3/SMTP server address, setting up a connection to a server identified by the default POP3/SMTP server address via the mobile communication network using a standard POP3/SMTP protocol, and in the proxy server evaluating a user identification based on specific information assigned to the user, identifying a user e-mail account assigned to the user identification, and setting up a connection to the identified e-mail account of an e-mail system.

12 Claims, 1 Drawing Sheet

U.S. PATENT DOCUMENTS

| | | | |
|---|---|---|---|
| 2002/0126708 A1* | 9/2002 | Skog et al. | 370/522 |
| 2002/0152274 A1* | 10/2002 | Shino | 709/206 |
| 2003/0174167 A1* | 9/2003 | Poo et al. | 345/752 |
| 2003/0191799 A1* | 10/2003 | Araujo et al. | 709/203 |
| 2004/0139204 A1* | 7/2004 | Ergezinger et al. | 709/229 |

OTHER PUBLICATIONS

Sony: "CMD-J5 Mobile Telephone Operating Instructions", Dec. 31, 2000, pp. 52-53.

* cited by examiner

METHOD AND SYSTEM FOR PROVIDING EASY ACCESS TO AN E-MAIL ACCOUNT VIA A MOBILE COMMUNICATION NETWORK

FIELD OF THE INVENTION

The invention relates to a method and a system for providing easy access to an e-mail account via a mobile communication network. In particular, the invention relates to a method and a system for providing easy access to a POP3/SMPT e-mail account.

BACKGROUND OF THE INVENTION

Mobile access to e-mail accounts has been a well-known feature since the introduction of WAP (Wireless Application Protocol) services in digital mobile communication networks, for example mobile communication networks of the GSM type. In commercially available mobile communication terminals, especially of the higher price segment, POP3 and SMTP clients are implemented for direct access to e-mail accounts via POP3 and SMTP servers. FIG. 1 shows an example of how a user can access POP3/SMTP servers via a mobile network 1 with a properly configured mobile terminal 2. This requires a knowledge of the correct POP3/SMTP server address by the user. An access to the e-mail account will be granted for example with the parameters user name UN and password PW which must be input in the mobile terminal 2 and usually can be stored therein. The parameters are transmitted via a base transceiver station 3 of the mobile network 1 to an e-mail server 4 containing an appropriate e-mail account. The configuration of the POP3/SMPT server address and the UN and PW usually has to be made manually by the user because it contains user individual data. This is a common access method which can already be used via modern digital mobile communication networks.

The use of mobile access to e-mail accounts is mainly affected by two issues:

Generally, the mobile terminals are delivered to the user without any POP3/SMTP configurations. In this case no POP3/SMTP communication can be built up because the mobile terminal does not know which e-mail server to address. The user has to configure the mobile terminal either manually or over the air (OTA) with a set of valid POP3/SMTP parameters. Even users who do already have an e-mail account are often lacking information how to configure their mobile terminals by programming their client parameters, particularly the POP3 and SMTP server addresses of the e-mail account.

A large number of mobile terminal users do not have any e-mail account.

SUMMARY OF THE INVENTION

A general object of the present invention is therefore to describe a method and a system which can offer users of a mobile communication network easy access to an e-mail account without special knowledge of mobile terminal programming or any POP3 or SMTP parameters.

To achieve these and other objects the present invention provides a method and a system according to the features of the independent claims. Further features and preferred embodiments of the present invention are provided in the dependent claims.

According to a preferred embodiment the present invention will also offer an automatic registration of a new e-mail account to users who wish to do so. The automatic registration procedure is easy to use. Ideally, the user who requires an e-mail account would be offered one without any complicated registration procedures. It is particularly undesirable to require a registration via a WEB interface to which the user might not have access to. So the registration process should be as automated and transparent as possible. This could then potentially be used as a basis to offer the user an easy e-mailing possibility from his mobile terminal, e.g. to transmit a video attachment via e-mail.

The inventive concept can be extended to also support the IMAP4 protocol or any Internet markup language front end when connected via a mobile communication system. In this case the same principle applies as for the POP3/SMPT protocols.

The present invention bears some advantages compared to the readily available e-mail access procedures:

A user specific pre-configuration on the mobile terminal side is avoided. There are no complex access processes or any undesirable security issues resulting from personalized mobile terminals 2.

A generic configuration of mobile terminals, e.g. a network operator specific configuration, is provided which gives easy access to the e-mail system.

Some legacy mobile terminals can be OTA configured with generic network operator specific e-mail configurations.

Legacy mobile terminals which cannot be OTA configured would need to be configured manually to the network operator specific e-mail configurations.

These and other objects, advantages and novel features according to the present invention will become more apparent from the following detailed description of a preferred embodiment thereof, when considered in conjunction the accompanying drawing, where

DESCRIPTION OF A PREFERRED EMBODIMENT OF THE INVENTION

Figure 1:
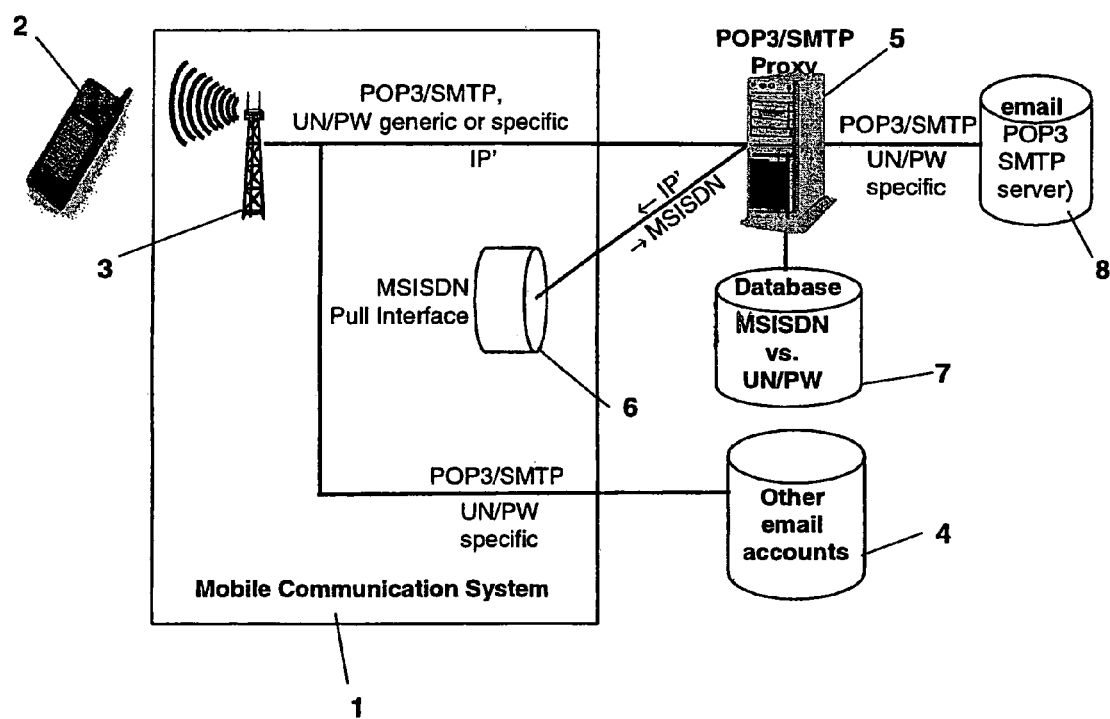
FIG. 1 shows a block diagram of the system architecture for carrying out the invention.

The following description deals with an e-mail access via a local POP3/SMTP client in the mobile terminal 2. Of course client using a IMAP4 or any Internet markup language front end when connected via a mobile communication system may also be used.

General Principle of Invention

According to the invention the mobile terminal 2 is pre-configured with a default POP3/SMTP server address, e.g. "POP3.domain.tld" and "SMTP.domain.tld". The configuration is generic to all mobile terminals 2 used with a specific mobile communication network 1 or a specific mobile communication provider, and therefore contains no user specific parameters such as an user name UN and a password PW. The POP3/SMPT client of the mobile terminal 2 can be provided with a generic UN and PW because in some cases they are probably required for the POP3 protocol.

For accessing an e-mail account a communication is built up between the mobile terminal 2 client and a proxy server 5 via the mobile network 1 using standard POP3/SMTP protocols. The proxy server 5 knows the temporary IP address assigned to the mobile terminal and can resolve this address into the subscriber's MSISDN by pulling an IP/MSISDN interface 6. With the MSISDN data the proxy server 5 can access a database 7 where the individual UN/PW is stored for each MSISDN with an e-mail account. The proxy server 5 then takes over the communication with the standard POP3/SMTP e-mail server 8 to send/retrieve e-mails of the identified e-mail account.

According to an alternative embodiment of the invention the MSISDN can be used to grant direct access to the user's e-mail account as it is considered to be authentic when provided by the mobile communication network 1.

The proxy server 5 can be implemented either as an integral part of the e-mail system 8 or as an external stand-alone part. For certain functionalities like the auto-registration mechanism described below, a specific, probably proprietary, connection to the e-mail system 8 would be necessary.

The POP3/SMTP proxy server 5 can generally be implemented to offer access to any POP3/SMTP server 4. A generic auto-registration of e-mail accounts is not possible in this case, except if a specific, probably proprietary, connection to this e-mail server 4 is given.

As mentioned above, the method according to the invention makes use of mobile terminals 2 with a generic POP3/SMTP configuration. The configuration contains the POP3/SMTP server addresses of default network operator servers, e.g. "POP3.domain.tld" and "SMTP.domain.tld". Mobile terminals 2 are either pre-configured on the manufacturer side or network provider side with these server addresses or can be configured by the user manually or over the air depending on the mobile terminal capabilities. No user specific data is contained in the default configuration data. In cases where the POP3 protocol requires a generic UN and PW in the terminal client, a dummy UN/PW can be used. The dummy UN/PW have to be unique as the described auto registration will be only triggered, if UN/PW are properly configured. This is to avoid a generation of new e-mail account, if the user inputs a incorrect specific UN/PW combination in the mobile terminal 2 for getting direct access to a specific e-mail account.

According to the invention mobile terminals 2 with a user specific mobile terminal configuration can also be used. User specific UN and PW are typically stored in the mobile terminal 2 along with the POP3/SMTP server addresses of the e-mail server 8. Thus, the mobile terminal 2 is personalized to the user. Access to the configured e-mail account(s) will be possible irrespective of the SIM card used in the mobile terminal 2. Several user specific settings and configurations can be stored in the mobile terminal 2 depending on its capabilities. The user would then select the settings to be used before starting the communication. In this case, the proxy server 5 will be transparent for the transmitted date and an access to the requested e-mail server will be given by using the user specific UN/PW configured in the e-mail client. This provides the user with the possibility of accessing an e-mail account which is not associated with his MSISDN.

Mobile terminals 2 with a generic and a user specific POP3/SMTP configuration can also be used. The user would then select the POP3/SMPT settings to be used before starting the communication.

User Identification

An access to the e-mail account is generally achieved by using the POP3/SMTP protocol with a UN/PW. In case of a generic configuration of the mobile terminal 2 no user specific UN/PW are available. It is then the task of the POP3/SMTP proxy server 5 to resolve the temporary IP address of the user (IP') into the user's MSISDN and subsequently allow access to the e-mail system 8 and the user specific e-mail account.

The two possibilities of achieving access to the users e-mail account are detailed in the following.

Lookup of UN/PW in a Database

Once the user has been identified by his MSISDN, the proxy server 5 can retrieve the respective UN/PW for this MSISDN. The proxy server 5 would then communicate with the e-mail POP3/SMTP servers 8 with the user's UN/PW. The issue with this approach is that the PW would then need to be stored in plain text in a database. This could raise legal and security concerns.

Usage of MSISDN as UN/PW

Instead of looking up the user's UN/PW, the MSISDN can be used as an alternative PW when accessing an e-mail account 8 via a mobile network 1. In mobile networks, the user's MSISDN can be considered to be authentic thus offering a reliable way to identify and authenticate the user. The user would be granted access to an e-mail account solely based on his MSISDN, if and only if the access is achieved via a mobile network 1. In this case the user does not need to have or know any UN/PW.

If the user wants to access his e-mail account via the Internet etc., the MSISDN can not be used as a. PW substitute in this case since it is public data and could be entered by anyone. The e-mail system would then need two sets of possible PW: One which would be the combination of UN/PW which can be used in any case. The other would be the user's MSISDN which would be only accepted, if used within an access via a mobile network, i.e. its authenticity is validated.

Automatic Registration of First Time Users

If the user has no e-mail account, the method according to the invention provides an auto-registration for a new e-mail account. The auto-registration is carried out at the first time a user will request access to the e-mail system 8. Users who do not have any e-mail account can easily register themselves with the e-mail system 8. The e-mail system automatically offers an individual e-mail account as soon as a first time user tries to access the e-mail service with the generic POP3/SMTP setting stored in his mobile terminal 2. The following steps will be carried out then:

The POP3/SMTP proxy server 5 will recognize an e-mail server access request from a user by the generic POP3/SMTP parameters which it receives from the mobile terminal 2. In this case the MSISDN of the user is not yet registered in the database 7, i.e. the proxy server 5 is not able to retrieve UN/PW entries for the user. The proxy server 5 will trigger the e-mail system 8 to automatically create a new e-mail account for this MSISDN. For example the new e-mail account will have a default address following the scheme "MSISDN@domain.tld" or the like. The MSISDN will then be stored in the proxy server's database 7 as one which is already registered for an e-mail account. If necessary, the UN/PW are generated automatically and stored in the database 7 for UN/PW under this MSISDN. The UN can for example be the user's MSISDN.

Now, the user can send and receive e-mails under the new e-mail address from the e-mail system 8.

UN/PW are not communicated to the user or only on request, if the user wishes to change the parameters UN/PW. The UN/PW will also be communicated to the user, if there is an attempt to access the e-mail account via any Internet markup language front end when not connected via a mobile communication system. In this case the user may type in his MSISDN as UN. The PW is then sent to the user's mobile terminal via Short Message Service (SMS).

A regular registration via any Internet markup language front end when not connected via a mobile communication system is also possible. In this case an association of the e-mail account to a valid MSISDN is required. This can be done e.g. by sending a challenge SMS containing a password to the MSISDN which then has to be entered at the front end for validation purposes. After completing the registration process the account will be handled and can be accessed in the same way as one that was created with the auto-registration process.

The user will not be able to receive any e-mails unless he has registered for an account, either "manually" or via the auto-registration process described above.

Recurrent Access

After registration to the e-mail system 8, the user will be identified by the proxy server 5 by his MSISDN and will be granted access to his present e-mail account either directly or by the UN/PW which are retrieved from the UN/PW database 7 under the user's MSISDN.

In general, the user is not required to have knowledge of his UN/PW, if an access to the e-mail system occurs via the mobile communication network 1 where the user can be identified by means of his MSISDN. For an access via Internet the user needs to have knowledge of the UN/PW.

If the mobile terminal 2 is pre-configured with a generic UN/PW combination the user will be auto-registered by the proxy server 5/e-mail system 8 during his first time access, or granted access to his e-mail account, if already existent, after being identified by his MSISDN.

If the user uses a correct user specific UN/PW combination, but not the generic one, the user will be granted direct access to a specific other e-mail account 4 irrespective of the used SIM card and MSISDN.

If the user uses an invalid user specific UN/PW combination, e.g. if the user mistypes his user specific UN/PW combination, the proxy server 5 will not trigger for an auto-registration nor will give access to any e-mail account as the UN/PW combination is incorrect. The user will be prompted an error message instead indicating that the UN/PW combination is invalid.

POP3/SSL and SMTP/SSL

The proxy server 5 can also support POP3/SSL and SMTP/SSL access, if required. The secure SSL connection must be decoded at the proxy server 5 side and re-encoded by the proxy server 5 to communicate with the e-mail system 8. If the proxy server 5 is not implemented as an integral part of the e-mail system 8 there will be no end to end security.

Deletion of Unused E-mail Accounts

The provision of e-mail accounts has a commercial aspect since licensing is typically made on a per account and monthly basis. Since the registration for an e-mail account is facilitated to a large extent it is important to have a concept for deletion of e-mail accounts which are not used anymore in order to cut costs.

After a predefined time period, e.g. one month, has elapsed without activity from the user on his e-mail account where the identification of the user has been through his MSISDN, the association of the MSISDN with the user's account can optionally be removed and the MSISDN is deleted from his profile. Subsequently, the user's account is considered to be an unused e-mail account which should be deleted after a predefined time.

Fixed Subscriber ID

Throughout the document the use of the subscriber's MSISDN is assumed for user identification and as a default alias for the e-mail address. The problem with the MSISDN is that it is subject to the network operator's business processes. For example, after the subscriber's contract has been deleted the MSISDN will typically be reused after a certain period of time. The new subscriber with the reused MSISDN would then receive e-mails for the former subscriber. This could lead to confusion and potential data privacy issues. Similar scenarios will occur when a user changes his MSISDN within a contract. To address this problem, a fixed subscriber-ID instead of the user's MSISDN can be used. The subscriber-ID should be unique to the subscriber, never be reused, and cover all network operator's internal business processes regarding MSISDN. The only disadvantage of this workaround is that the default alias for the e-mail address will then be a cryptic number instead of an appealing MSISDN which would be easier to remember. The user has in any case the option to chose an alias of his own, so this should not be a major disadvantage.

LIST OF REFERENCE NUMERALS AND ABBREVIATIONS

1 Mobile Communication Network
2 Mobile Terminal
3 Base Transceiver Station
4 E-mail Account
5 Proxy Server
6 Pull interface
7 Database
8 E-mail system (account)
IMAP4 Internet Message Access Protocol 4
MSISDN Mobile Subscriber ISDN number
OTA Over the air
POP3 Post Office Protocol 3
PW Password
SIM Subscriber Identification Module
SMTP Simple Mail Transfer Protocol
SSL Secure Socket Layer
UN User name
WAP Wireless Application Protocol

The invention claimed is:

1. A method for providing access to a POP3/SMTP e-mail account of a user via a mobile communication network, comprising:

providing a mobile terminal having loaded therein a generic pre-configured default e-mail configuration common to all mobile terminals used with a specific mobile communication network, the pre-configured default e-mail configuration including at least one default POP3/SMTP server address;

setting up a connection to a proxy server identified by the default POP3/SMTP server address via the mobile communication network using a standard POP3/SMTP protocol;

in the proxy server:
evaluating a user identification by interrogating a first database containing specific information assigned to the user of the mobile terminal based on the user identification;
identifying an e-mail account of the user provided by an e-mail system;
retrieving access parameters, including a user name UN and a password PW assigned to the user identification, for accessing the identified e-mail account by interrogating a second database;
setting up a connection between the mobile terminal and the identified e-mail account of the e-mail system by transmitting the e-mail address, the user name UN and the password PW to the e-mail system;

wherein on the first access request of a user identification unknown to the proxy server, the proxy server automatically creates a new e-mail account for said user identification, and wherein the step of identifying a POP3/SMTP e-mail account comprises the steps of:

interrogating the second data base whether there is already a registered e-mail account for the presented user identification, and if there is no e-mail account for the presented user identification, creating a new e-mail account in the e-mail system, and storing the user specific parameters for the e-mail account together with the corresponding user identification in the second database.

2. The method according to claim 1, wherein such method also supports IMAP4 protocol and any Internet markup language front end when connected via a mobile communication system.

3. The method according to claim 1, wherein the specific information comprises an IP-address temporarily assigned to the user's MSISDN.

4. The method according to claim 1, wherein the user identification comprises an international mobile subscriber number (MSISDN).

5. The method according to claim 1, wherein the user identification comprises an individual identification number.

6. The method according to claim 1, wherein an identification and authentication of the user is provided by the authentication procedures of the mobile communication network.

7. The method according to claim 1, wherein upon identification of a specific e-mail account via UN/PW, the proxy server transparently transmits the message to the addressed e-mail system/account.

8. The method according to claim 1, characterized in that a regular registration via any Internet markup language front end when not connected via a mobile communication system is provided by sending a challenge SMS to the MSISDN, the challenge SMS containing a password which then has to be entered at the front end for validation purposes for the registration of an e-mail account.

9. A system for providing access to a POP3/SMTP e-mail account of a user via a mobile communication network, comprising:

a mobile terminal having loaded therein a generic pre-configured default e-mail configuration common to all mobile terminals used with a specific mobile communication network, the pre-configured default e-mail configuration including at least one default POP3/SMTP server address;

a proxy server connected to the mobile communication network to which the default POP3/SMTP server address is assigned;

means for evaluating a user identification by interrogating a first database containing specific information assigned to the user of the mobile terminal;

means for identifying an e-mail account assigned to the user identification;

means for retrieving access parameters, including a user name UN and a password PW assigned to the user identification, by interrogating a second database for accessing the identified e-mail account;

means for setting up a connection between the mobile terminal and the identified e-mail account by transmitting the e-mail address, the user name UN and the password PW to the e-mail system;

an e-mail system comprising the identified e-mail account;

means in the proxy server for automatically creating a new e-mail account for said user identification on the first access request of a user identification unknown to the server;

means for interrogating the second database whether there is already a registered e-mail account for the presented user identification; and means for storing the user specific access parameters for the e-mail account together with the corresponding user identification in the database if there is no e-mail account for the user identification and a new e-mail account in the e-mail system has been created.

10. A system according to claim 9, wherein the proxy server is part of the e-mail system.

11. A system according to claim 9, wherein the proxy server is part of the mobile communication network.

12. A system according to claim 9, wherein the server is a standalone system.

* * * * *